United States Patent
Holtz

[11] 3,914,670
[45] Oct. 21, 1975

[54] APPARATUS FOR DAMPING OSCILLATIONS IN THE PROPULSION DIRECTION IN A MAGNETICALLY SUSPENDED PROPULSION VEHICLE DRIVEN BY A SYNCHRONOUS LINEAR MOTOR

[75] Inventor: Joachim Holtz, Erlangen, Germany

[73] Assignee: Siemens Aktiengesellschaft, Munich, Germany

[22] Filed: Nov. 4, 1974

[21] Appl. No.: 520,856

[30] Foreign Application Priority Data
Nov. 15, 1973 Germany............................ 2357147

[52] U.S. Cl............................ 318/135; 104/148 LM
[51] Int. Cl.² ........................................ H02K 41/02
[58] Field of Search ..... 318/135, 687; 104/148 LM, 104/148 MS

[56] References Cited
UNITED STATES PATENTS
3,638,093  1/1972  Ross............................ 104/148 MS
3,736,880  6/1973  Ross............................ 318/135 X

*Primary Examiner*—R. N. Envall, Jr.
*Attorney, Agent, or Firm*—Kenyon & Kenyon Reilly Carr & Chapin

[57] ABSTRACT

A track bound propulsion vehicle such as a magnetically suspended vehicle and driven by a synchronous linear motor having a stator supplied from a fixed ac network with the stator installed along the track as a travelling field winding has a correcting element furnishing an ac output voltage at the network frequency and also connected to the travelling field winding to superimpose a voltage thereon with the phase of the ac output voltage of the correcting element adjustable by means of a control signal receiving an input from means measuring a quantity proportional to oscillations in the propulsion direction for damping such oscillations.

21 Claims, 5 Drawing Figures

APPARATUS FOR DAMPING OSCILLATIONS IN THE PROPULSION DIRECTION IN A MAGNETICALLY SUSPENDED PROPULSION VEHICLE DRIVEN BY A SYNCHRONOUS LINEAR MOTOR

BACKGROUND OF THE INVENTION

This invention relates to track bound propulsion vehicles driven by synchronous linear motors, in particular magnetic suspension vehicles driven in this manner, in general and more particularly to improved apparatus for damping oscillations in the propulsion direction in such a vehicle.

Vehicles of this nature in which the synchronous linear motor driving the vehicle comprises a stator having a travelling field winding and installed along the track and an exciter located on the magnetic suspension vehicle as a comovable translator are well known.

Linear motors offer an excellent means of providing propulsion for track bound self-propelled vehicles used in local traffic cabin type transit systems, rapid transit railroads and for high performance rapid transit railroad operating at speeds up to 500 km/hr. Among the individual variants of this type of a motor a synchronous linear motor whose stator is installed along the roadway as a travelling field winding and whose exciter is installed in the vehicle as a comovable translator demonstrates high efficiency and simple energy transmission. Such a synchronous linear motor is also referred to as a synchronous long stator motor because of the unusual length of the stator. In the following, the term "linear motor" always refers to such a long stator motor.

As is well known by those skilled in the art, a synchronous linear motor consists of two parts (see Arch. f. Elektrotechn, vol. 55, no. 1 (1972) pages 13 to 20.) Thus, either a dc carrying exciter winding, which may extend over the entire length of the vehicle, or a permanent magnet is installed on the self-propelled vehicle as the comoving exciter (translator). A travelling field winding (stator) is installed along the roadbed. The travelling field winding, which generally is a multi-phase winding, produces a travelling field which travels in the longitudinal direction of the roadbed and drives the vehicle, as a function of the voltage and frequency supplied thereto.

When operating a synchronous motor from a fixed ac network it has been found through experience that electromechanical oscillations or hunting will occur, which oscillations are imposed on the translatory motion of the magnetically suspended vehicle. Such oscillations, which may be initiated by a wind gust or the like not only impair the riding comfort but may also lead to a condition where the synchronous linear motor falls out of step and stalls. Similarly a situation can arise where the synchronous linear motor will not start at all.

The measures employed in rotating synchronous machines to damp oscillations such as the use of a damping winding or a solid rotor cannot be used in the synchronous linear motor used in track bound vehicle propulsion. The principle of active oscillation attenuation using a control circuit as taught in German Offenlengungsschrift 2,132,179 for rotating synchronous machines cannot be directly applied to a synchronous linear motor fed from a fixed ac network either. Because its frequency and ac input voltage are fixed, predetermined quantities and a control member are not provided.

In view of this it can be seen that there is a need for apparatus for overcoming such oscillations. Such an apparatus should be capable of overcoming instabilities at every operating point of the vehicle either attenuating the oscillations or even completely suppressing them.

SUMMARY OF THE INVENTION

The present invention is based on the discovery that the known principle of active oscillation attenuation using a control circuit as taught in the aforementioned German Offenlegunsschrift can be used with a synchronous linear motor if suitable control means are created. For cost reasons such a control element should however be designed not for the maximum capacity but only for a fraction of the maximum capacity of the synchronous linear motor. That such is possible is based on the realization that only that component of the energy content of the propulsion vehicle which deviates from the value of the kinetic energy of the associated quasi-stationary operating point need be made zero in an active damping control. This component is thus the oscillation energy which must be compensated for.

In accordance with the present invention the above noted problems are solved through the provision of a control member designed for a fraction of the maximum capacity of the synchronous linear motor which furnishes an ac output voltage network frequency and is connected to the travelling field winding together with the ac network voltage so that the two voltages are superimposed. For control purposes the phase of the ac output voltage of the control means is adjustable through the use of a control signal supplied by a control device obtaining an input from measuring means developing a quantity proportional to the power oscillations of the synchronous linear motor.

In some applications it is advisable that the magnitude of the ac output voltage of the control means be adjustable using the control signal along with adjustment of phase. With such an arrangement it is then possible for example to adjust the propulsion vehicle, travelling along an inertia secion of track, to any desired operating point.

In one particularly advantageous embodiment which is illustrated a controlled converter fed by the fixed ac voltage network is used as the control means. The converter will preferably be constructed using semiconductor rectifiers such as diodes and thyristors. For the purpose of adjusting the input voltage of the converter to a value which is consistent with the characteristics of the semiconductors used, the converter is coupled to the ac voltage network through a transformer. Particularly useful in this application is an intermediate link converter.

In accordance with one illustrated embodiment of the invention a coupling transformer is disposed in the connection between the ac network and the travelling field winding and is used to superimpose the ac output voltage of the control means on the ac network voltage. In accordance with another emobdiment one end of the travelling field winding is connected to the ac network and the other end to the control means so that the output voltage of the control means will be superimposed on the ac network voltage.

In accordance with the further embodiment a combined control member and means for super-position of the ac network voltage and ac output voltage of the control means are obtained through the use of a rotary transformer fed from the fixed ac network with the control signal used as an input to a servo drive mechanism used to adjust the rotary transformer position and thus the phase of its ac output voltage. Such an arrangement for properly superimposing the required voltages is particularly inexpensive. In this embodiment the transformation ratio of the transformer should be less than 1.

In some cases the type of measuring means used to provide an input to the control circuit will furnish a constant quantity in addition to the quantity proportional to the power oscillations. Where such occurs and in the presence of interference factors, it is advisable to provide a filter to separate out the time variable quantities which are of interest. In such an arrangement the input of the filter is connected to the measuring means and the output is connected to the input of the control device. The filter may be a band pass filter tuned to the oscillation frequency range. If the requirements for the filter are not stringent, in regard to the slope filter curve at cut off, a passive filter may be used. Where greater accuracy is required the use of an active filter is advisable. It is also possible to use a high pass filter which in the simplest case may simply be a blocking capacitor. Typical of measuring means which furnish a quantity proportional to power oscillations are those providing an output proportional to electric power and those providing an output proportional to a mechanical quantity depending on electrical power variations. In the first class are measuring means of the type which measure active electric power. Such measuring means may be placed in the connection between the coupling transformer and the travelling field winding. Because the voltage of the network is constant, at least during inertia travel, a current transformer measuring the stator current may be used instead of means for measuring power. This current transformer may also be disposed in the connection between the coupling transformer and the travelling field winding. An example of the second type of measuring means is a mechanical measuring means such as an accelerometer for measuring the linear acceleration of the propulsion vehicle which is stationarily coupled to the translator. In addition a pole position transmitter measuring the position of the translator of the synchronous linear motor in relation to the travelling field generated by the travelling field winding may also be used.

The type of control member described above used for feeding additional energy into the travelling field winding in synchronism with detected oscillations for the purpose of damping leads to another possibility for operation. In the normal case when the damping control is active the propulsion vehicle is maintained in an inertia mode of travel, i.e. it is operated at a single travel speed.

The use of the control means has as a further advantage that, for example, after interfering influences which have led to the stalling of the motor vehicle, it is possible through the use of the control means to perform a starting procedure and to maintain emergency operation at reduced travel speed. Starting through use of the control means is possible if both the frequency and the magnitude of its ac output voltage are adjustable. In order to provide for such emergency operations it is advisable to provide in the connection between the fixed ac voltage network and the travelling field winding a switch. This switch in a first position couples the traveling field winding to the ac network and in a second position disconnects the travelling field winding therefrom connecting the leads instead to common neutral point.

DETAILED DESCRIPTION OF THE PREFERRED EMBODIMENT

Figure 1:
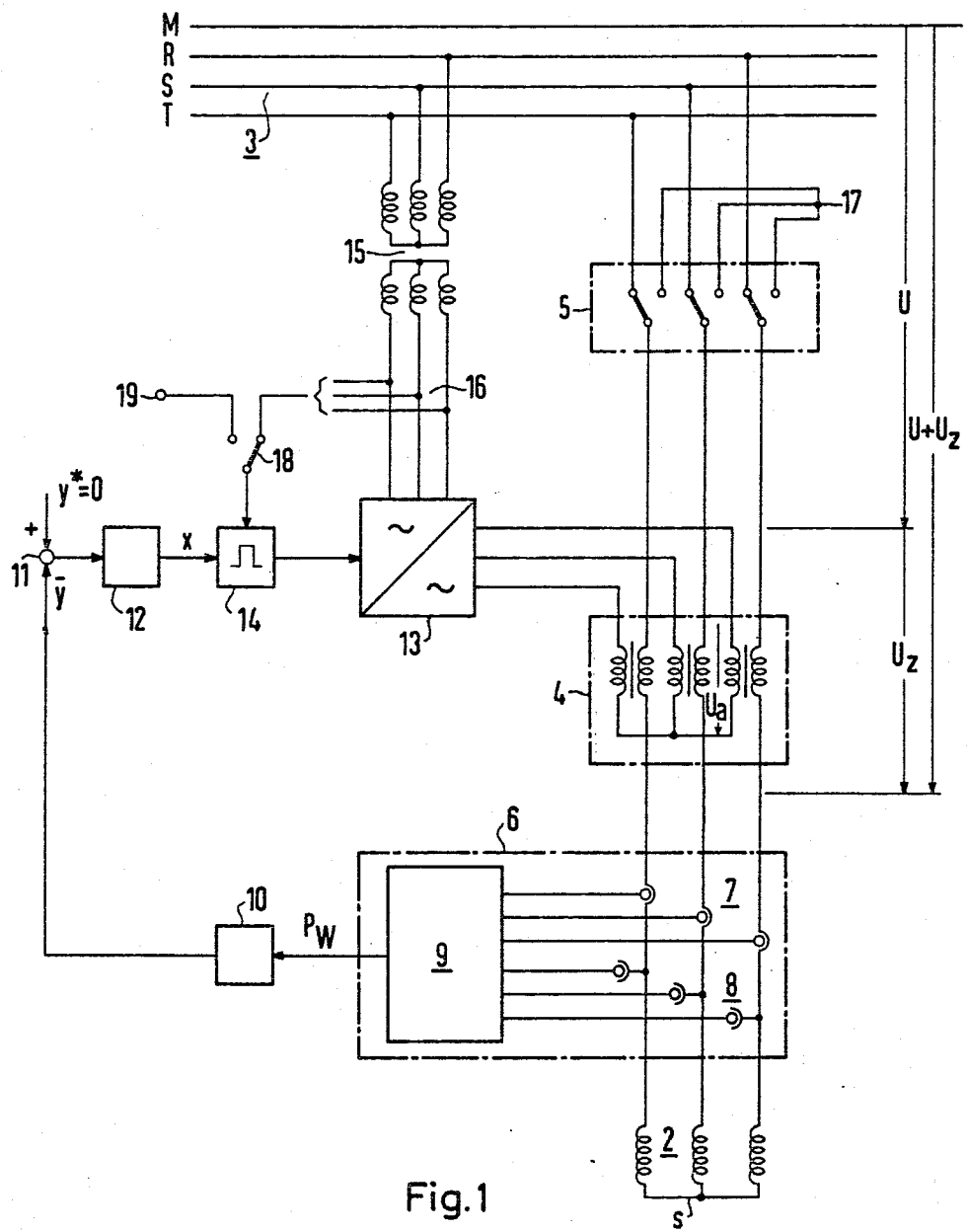
FIG. 1 is a schematic-block diagram of a synchronous linear motor having a first embodiment of the present invention installed.

FIG. 1 illustrates a synchronous linear motor 2 to which the first embodiment of the present invention is coupled. The synchronous linear motor 2 is a three phase Y connected travelling field motor having a neutral point $s$. The travelling field winding 2 forms a portion of the synchronous linear motor used for the propulsion of a magnetic suspension propulsion vehicle on a track. The travelling field winding 2 is arranged for the propulsion power and is installed along the track as the stator. Typically it will extend over long distances in the travel direction and is thus considered a long stator. A magnetic suspension vehicle may be, in particular, the propulsion vehicle of a high performance rapid transit system.

In addition to the travelling field winding 2, the linear motor includes an exciter (not shown) attached to the motor includes an exciter (not shown) attached to the magneticsuspension vehicle as a comovable translator. The synchronous linear motor under consideration may be one equipped with either a super conducting magnet coil as an ironless motor or a magnetic coil wound on a magnetic core as an iron containing motor or may be a permanently excited motor using a permanent magnet. In particular the exciter may be arranged as an exciter winding which is housed in a pole piece of ferromagnetic material. In feeding the exciter winding a direct current source will typically be provided, the direct current of which is either constant or can be controlled by means of a control arrangement. During the operation of the magnetic suspension vehicle the exciter including the magnetic suspension vehicle is maintained in a suspension above the track using a suspension device such as an electrodynamic suspension system which is not illustrated herein. As a result of the suspension there will be a gap of essentially the same width at all points between the track and the bottom surface of the magnetic suspension vehicle. It is in this gap that the travelling field winding 2 generates a travelling field.

The travelling field winding 2 is supplied with power from a three phase AC network 3 having phase conductors R, S and T and a neutral conductor M. The network will typically be a fixed network having a frequency of 50 to 60 Hz and an AC voltage of 10 kv. In the connection between the AC network 3 and the travelling field winding 2 the secondary winding of a coupling transformer 4 having a transformation ratio $u$ equal to 1 is disposed. A switch 5 is provided which permits disconnecting the transformer from the AC voltage network 3.

Through the switch 5 in the secondary winding of the coupling transformer 4, the travelling field winding 2 receives directly and uncontrolled the major part of the power required to propel the magnetic suspension vehicle. Experience has shown however that where such a direct supply system is used oscillations of the magnetic suspension vehicle will occur in the propulsion direction. Oscillations of this nature can be triggered, for example, by a wind gust hitting the vehicle head on. The oscillations are superimposed on the propulsion motion and are noticeable as disturbances in the travel operation of the vehicle. In addition, they can cause the synchronous linear motor to fall out of synchronism thus bringing the magnetic suspension vehicle to an unintentional stop. In order to eliminate these oscillations, the synchronous linear motor of FIG. 1 has a damping device accoring to the present invention installed.

To develop an input to control the damping of oscillations measuring means 6 which provide a signal output $P_w$ are provided. In the illustrated embodiment, the measuring means 6 comprise means for measuring active power disposed in the connection between the secondary winding of the coupling transformer 4 and the travelling field winding 2. More specifically, a current transformer 7 and a voltage transformer 8 are provided in each phase conductor. Their outputs are then provided to a conventional power computing circuit 9 which computes the active power from the measured stator current and the AC input voltage to the travelling field winding 2. The signal $P_w$ is a measure of the actual magnitude of the active power. It will contain a DC voltage component depending on the speed of travel and in addition will contain AC voltage components proportional to the oscillation in the forward direction. Thus, the active power measuring means can be used as a measuring means for determining the electromechanical power oscillations. In cases where the AC input voltage is always constant, the current transformer 7 alone may be used in the connection between the coupling transformer 4 and the travelling field winding 2 to measure the stator current which be proportional to power.

In order to eliminate the DC component in the output signal $P_w$ it is provided to a filter 10. Filter 10 may be an active or passive bandpass filter tuned to the oscillation frequency range of the magnetic suspension vehicle. The frequency range is generally below the network frequency of the AC voltage supply network 3. It depends on the mechanical design of the magnetic suspension vehicle and will typically be in the neighborhood of 1Hz. Alternatively, a high pass filter may also be used as filter 10.

The output $y$ of the filter 10 is a signal containing the portion of the import signal $P_w$ which oscillates at the oscillation frequency of the vehicle. The output signal $y$ is provided to a summing junction 11 where it is subtractively combined with a desired input $y^*$ equal to zero. In other words, it is desired that the signal $y$ representing the power oscillations be zero. The result of this summation is provided to a regulator 12. Regulator 12 may be an integrated regulator such as that disclosed in paragraph II.10 of "Application Manual for Operational Amplifiers for Modelling Measuring Manipulating and Much Else", Philbrick Nexus Research (1968). The output signal of the regulator is provided as an input to a control unit 14. In the illustrated embodiment the control means 13 comprise a static converter obtaining inputs from the control unit 14. The control signal X through the control unit 14 is used to vary the AC input voltage to the travelling field winding 2 in accordance with the oscillation through an action on the static converter 13. The static converter 13 will typically be an intermediate link converter utilizing controlled and uncontrolled semiconductor rectifiers. It is designed to handle a fraction of the maximum capacity of the synchronous linear motor. It need only be designed for the stabilization power which amounts to approximately 2 – 20% of the maximum propulsion power. The converter is supplied from the fixed AC system 3 through a transformer 15 having transformation ratio smaller than 1. Its output frequency is the same as that of the network frequency. This is assured by picking off the input frequency at 16 and providing it through a switch 18 through the control unit 14. The output of the converter 13 is provided to the primary winding of the coupling transformer 4. The coupling transformer 4 will thus serve to superimpose the AC output voltage $U_a$ of the control means 13 on the AC network voltage.

It is of decisive importance that the phase 5 of the AC output voltage $U_a$ from the converter or control means 13 be adjustable relative to the AC network voltage U by means of the voltage signal X which is supplied to the control unit 14 by the regulator 12. In order to obtain a reference for the phase of the AC output voltage $U_a$, the AC network voltage U or C stepped down AC input voltage of the control means 13 is taken off to the voltage transformer 16 and supplied to the control unit 14. This insures that the control unit and the converter are synchronized with the network. And as noted above, it results in an identical frequency of the output voltage $U_a$ and the network voltage U. The following pulses which are provided by the control unit 14 in conventional fashion to the control rectifiers of the converter are phase shifted relative to the zero crossings of the AC network voltage U as a function of the control signal. This also changes the phase of the output voltage $U_a$ of the converter relative to the AC network voltage U. The superposition or addition in the coupling transformer 4 results in overall output voltage (U + $U_z$) that clearly composed of the AC network voltage U and the supplemental AC voltage $U_z$ of the same frequency which differs from the AC output voltage $U_a$ only by the transformation ratio $\mu$ where $U_z = U_a$. The coupling transformer 4 can thus be viewed as a type of vectorial addition member. The amplitude of the overall AC output voltage (U + $U_z$) is adjustable on the converter side to the control signal X. This overall output voltage is then the AC input voltage to the travelling field winding 2. A control circuit is designed such that the supplemental AC voltage $U_z$ which is added by the control means 13 counteracts the power oscillations.

The three phase switch 5 described above is a double throw switch which in the position shown couples the AC network 3 in the secondary winding of the coupling transformer 4. In the position not shown this connection is broken and the leads of the coupling transformer 4 are connected instead to a common neutral point 17. This makes the coupling transformer 4 a normal, Y-connected transformer. Thus, in the second switch position the travelling field winding 2 can be supplied, for emergency operation, with reduced power and changed frequency, from the AC network through the coupling transformer 4, the control means 13 and the transformer 15. The frequency of the AC output voltage $U_a$ is determined in such a case by the control unit 14 which receives an input through the switch 18 being coupled to the terminal 19 at which point a frequency control signal is applied. The frequency can be controlled together with the AC output voltage $U_a$.

Figure 2:
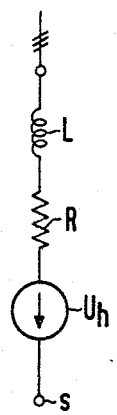
FIG. 2 is an equivalent circuit diagram for the synchronous linear motor of FIG. 1.

FIG. 2 illustrates the equivalent circuit of the synchronous linear motor. In the illustration the magnetic effect of the travelling field winding 2 and the exciter is taken into consideration. As illustrated, the synchronous linear motor comprises in its equivalent circuit configuration the series connection of a resistor having a resistance R and an inductive impedance having an inductive L along with a fictitious counter EMF force representing the effect of the main field voltage $U_a$.

Figure 3:
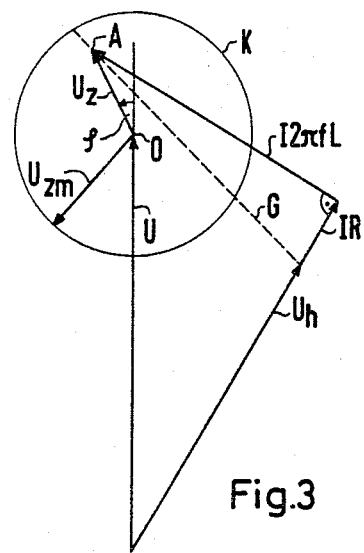
FIG. 3 is a vector diagram helpful in understanding the operation of the synchronous linear motor of FIG. 1.

FIG. 3 is a vector diagram helpful in understanding operation of the synchronous linear motor. The vector of the total AC output voltage $(U + U_z)$ is vectorially composed, at the operating point A, of the vector of the AC network voltage U which is fixed as to magnitude, frequency and phase and the vector of the supplemental AC voltage $U_z$ generated in the secondary winding of the coupling transformer 4. It should be noted that the phase $\phi$ of the AC output voltage $U_a$ of the control means 13 and thus, the phase of the phase $\phi$ of the supplemental AC voltage $U_z$ are adjustable relative to the AC network voltage U. Depending on the phase $\phi$, a different magnitude of the total AC output voltage $U + U_z$ results. However, the supplemental AC voltage $U_z$ is always smaller than or equal to a maximum possible supplemental AC voltage $U_{zm}$, the amount of which is determined by the magnitude of the AC network voltage U and the transformation ratio of the transformer 15. As a result, the operating point A always lies within the circle K centered at 0. It is possible, for example, to select the parameters such that the vectors U and $J_z$ are mutually parallel where there are no oscillations. On the other hand, the vector of the total AC output voltage $(U + U_z)$ can also result vectorially from the vector of the main field voltage $U_h$, the vector of the voltage drop IR at the resistor and the vector of the voltage drop $I2\pi fL$ at the inductive impedance. If the vectors of the main field voltage $U_h$ and the vector of the voltage drop IR are parallel, the synchronous motor operates at its optimum operating point. Such an optimum operating point can be determined for any given stator current I. At the optimum operating point the thrust of the synchronous linear motor, which is determined by the inner vector product $(U_h, IR)$, is a maximum for the corresponding stator current I. In the present case (inertial travel) the main field voltage $U_h$ and the resistance R are constant. Consequently, in order to vary the maximum thrust while staying at the optimum operating point, the stator current I must be varied. The tip of the resultant vector $(IR + jI2\pi fL)$ then move along the straight broken line G illustrated on the figure. Thus the straight line G is the locus for variable thrust with the respective optimum operating point of the synchronous linear motor retained. It is expedient to adjust the magnitude and phase of the basic value of the supplemental AC voltage $U_z$ so that its tip coincides with the tip vector of the inductive voltage drop $jI2\pi fL$. Influences interferring with operation such as hunting and oscillations are compensated by means of the control circuits of the present invention through a variation of thrust. The tip of the vector of the supplemental voltage $U_z$ and hence the phase $\phi$ then move along a circle centered at 0 in accordance with the control signal $x$. The multitude of the supplemental control voltage $U_z$ can be varied by the control signal $x$ simultaneously with the phase $\phi$ in such a manner that the tip of the vector of the supplemental voltage $U_z$ always moves along the straight line G. By doing so the synchronous motor always operates at its optimum operating point despite the insertion of the damping control circuit.

Figure 4:
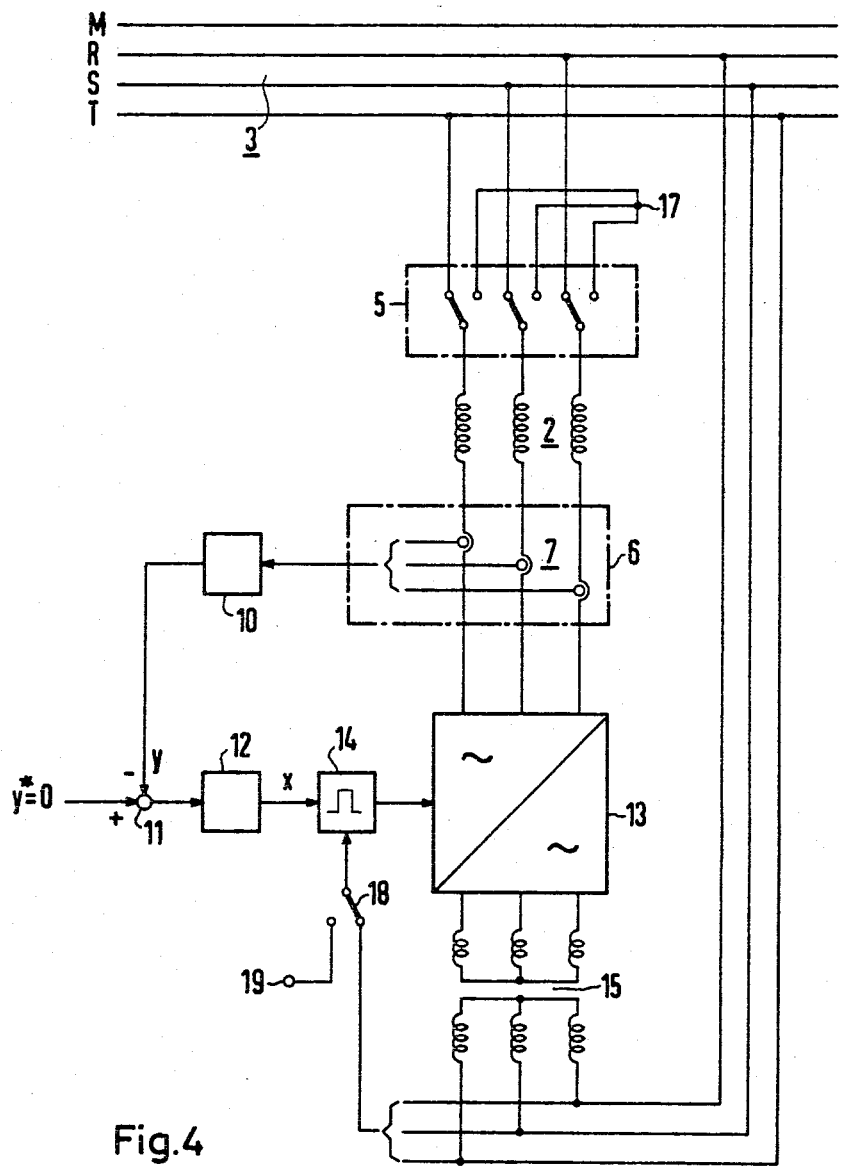
FIG. 4 is a schematic-block diagram of a synchronous linear motor having a second embodiment of the present invention installed.

FIG. 4 illustrates a slightly different embodiment of the present invention. In the arrangement illustrated, one end of the travelling field winding 2 without a neutral point is connected to a fixed AC voltage 3 through a switch 5. The switch 5 is used for the same purpose as the switch 5 in FIG. 1. In the switching position shown the connection between the network 3 and the travelling field winding is established. In another position this connection is broken and the terminals of the travelling field winding 2 are coupled to a common neutral point 17.

The travelling field winding 2 is normally installed along the track. However, it may be a travelling field winding which is located in the propulsion vehicle along with the exciter. In such a case the propulsion vehicle will run along a reaction rail of periodically variable local magnetic permanence. In other words the motor vehicle of the type which has been referred to a "H-Bahn" (Suspension Railroad) will be involved.

In the embodiment of FIG. 4 the other end of the travelling field winding 2 is connected through measuring means 6 to a control means 13 which as in the former embodiment may be a static converter. A control means 13 is again designed for a fraction of the maximum capacity of the synchronous linear motor. As before it furnishes an AC output voltage at the network frequency. The other connection of thr travelling field winding 2 to the AC network 3 at one end and to the output of the control means 13 at the other has the effect of superimposing the AC output voltage on the AC network voltage at the travelling field winding 2. Once again the control means 13 may be connected to the AC network 3 through a transformer 13 in a Y connection, with the transformer having a transformation ratio of less than 1.

The phase and optionally the magnitude of the output voltage of the control means are adjustable relative to the phase of the AC network using a control signal $x$ formed in a control circuit made up of the summing junction 11 and regulator 12 much in the same manner as described above. In this embodiment, however, the measuring means 6 comprises only current transformers 7 disposing the connection between the control means 13 and the travelling field winding 2.

When oscillations occur, the control means 13 feeds energy into the travelling field winding 2 in synchronism and in accordance with these oscillations. This energy compensates the oscillatory energy of the magnetic suspension vehicle.

Figure 5:
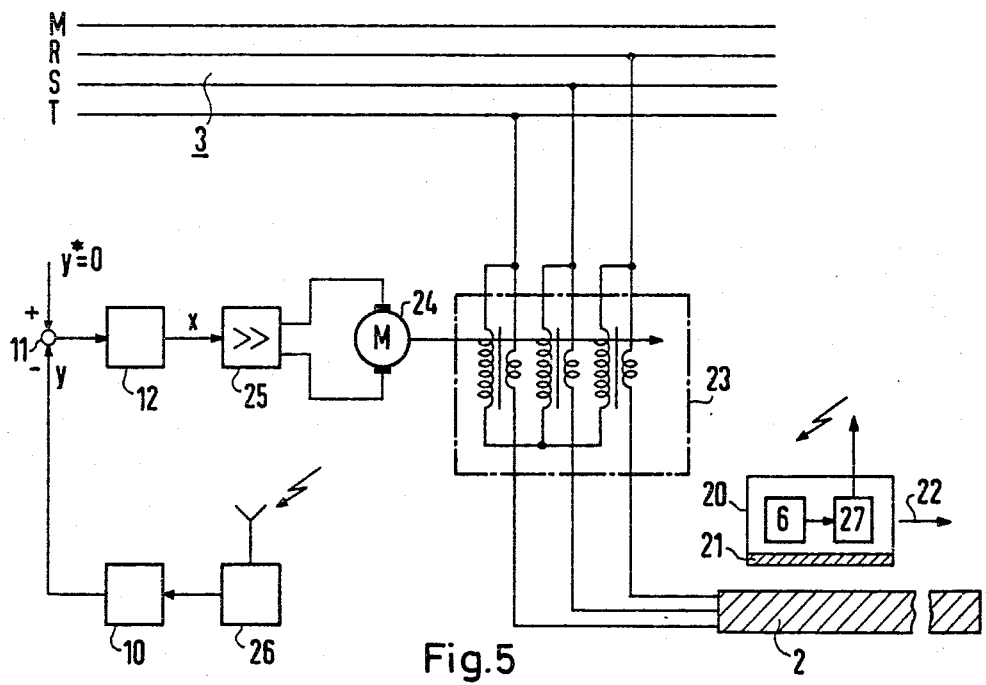
FIG. 5 is a schematic-block diagram of a synchronous linear motor with a third embodiment of the present invention installed.

FIG. 5 is a schematic representation of a further embodiment of the present invention. Shown is the synchronous linear motor comprising a travelling field winding 2 and an exciter field winding 21 which is disposed in the magnetic suspension vehicle 20. The synchronous linear motor moves the magnetic suspension vehicle 20 in the direction of arrow 22. The travelling field winding 2 is supplied directly from an AC network 3 to a rotary transformer 23 and a switch 5. The rotary transformer 23 in this embodiment performs the function of the control means as well as the function of the means for superimposing the output voltage of the control means on the output voltage on the AC network, i.e. it takes the place of the control means 13 and transformer 4 of FIG. 1. The Y connected primary winding of the rotary transformer 23 is coupled directly to the fixed AC network 3. The transformation ratio is considerably smaller than 1 preferably lying in the range between 0.02 and 0.2. A servo drive motor 24 supplied by an amplifier 25 is used for adjusting the rotary transformer 23 to control the phase of the AC output voltage. The amplifier 25 is acted upon by a control signal $x$ developed through the summing junction 11 and regulator 12 in the manner described above in connection with FIGS. 1 and 4. The summing junction 11 compares the reference signal $y^* =$ zero with the output signal $y$ from the filter 10. In the embodiment the filter 10 obtains its input from a radio receiver 26 receiving a signal containing a quantity proportional to the power oscillation of the synchronous linear motor. This signal is transmitted from a transmitter 27 obtaining an input from measuring means $y$ both of which are located in the magnetic suspension vehicle 20. The measuring means 6 in this case can be an accelerometer measuring the linear acceleration of the magnetic suspension vehicle which is thus a measure of thrust. Thus the magnitude and frequency of the oscillations of the magnetic suspension vehicle 20 in the propulsion direction are detected as oscillations of the linear acceleration and transmitted by radio to the receiver 26 located at a stationary point at the feeding station of the stator 2. Through the inclusion of the radio communication channel, a closed control unit is thus also present here. The effect of this control loop is essentially the same as the effect obtained in the embodiment of FIGS. 1 and 4.

Thus, an improved apparatus for damping oscillations in the propulsion direction which occur in a magnetically suspended vehicle propelled by a linear synchronous motor has been shown. Although specific embodiments have been illustrated and described, it will be obvious to those skilled in the art that various modifications may be made without departing from the spirit of the invention which is intended to be limited only by the appended claims.

What is claimed is:

1. In a track bound propulsion vehicle such as a magnetic suspension vehicle having a synchronous linear motor with a stator supplied from a fixed ac network the stator acting as a travelling field winding and having an exciter disposed in the magnetic suspension vehicle as a comovable translator apparatus for damping oscillations in the forward propulsion direction comprising:

a. measuring means for developing an output signal proportional to the power oscillations of the synchronous linear motor, b. means having as an input the output of said measuring means for developing a control signal; and c. control means providing an ac output voltage at the frequency of the fixed ac network, said output coupled to said travelling field winding so as to be superimposed on the ac network voltage, with the phase ac output voltage of said control means changing in response to said control signal.

2. Apparatus according to claim 1 wherein said control signal also acts to change the magnitude of the ac output voltage of said control means.

3. Apparatus according to claim 1 wherein said control means comprises a controlled converter supplied from said fixed ac network.

4. Apparatus as in claim 3 wherein said converter is coupled to the fixed ac network through a transformer.

5. Apparatus according to claim 4 wherein said converter is an intermediate link converter.

6. Apparatus according to claim 1 wherein the superposition of the output voltage of said control means on the ac network voltage is accomplished with a coupling transformer disposed between said ac network and said travelling winding.

7. Apparatus according to claim 6 wherein the transformation ratio of said coupling transformer is approximately 1.

8. Apparatus according to claim 1 wherein said superposition is accomplished by coupling one end of said travelling field winding to said ac network and the other end of said travelling field winding to the output of said control means.

9. Apparatus according to claim 1 wherein said control means comprise a variable rotary transformer coupling the ac voltage network to said travelling field winding and a servo system controlling the positioning of said variable transformer for adjustment of the phase of its output signal, said servo system having said control signal as an input, said rotary transformer at the same time providing for the super-position of the voltage of the ac network and the ac output voltage of the control means.

10. Apparatus according to claim 9 wherein the transformation ration of said variable transformer is less than 1.

11. Apparatus according to claim 1 and further including a filter between said measuring means and said means developing a control signal.

12. Apparatus according to claim 1 wherein said filter is a band pass filter tuned to the oscillation frequency range.

13. Apparatus according to claim 1 wherein said band pass filter is a passive filter.

14. Apparatus as in claim 1 wherein said band pass filter is an active filter.

15. Apparatus according to claim 1 wherein said filter is a high pass filter.

16. Apparatus as in claim 1 wherein said measuring means comprises means for measuring active electrical power.

17. Apparatus according to claim 1 wherein said measuring means comprises a current transformer for measuring the stator current.

18. Apparatus as in claim 17 wherein said measuring means is disposed in the connection between said coupling transformer and the travelling field winding.

19. Apparatus as in claim 1 wherein said measuring means is a pole position transmitter measuring the position of the translator of the synchronous linear motor relative to the travelling field generated by the travelling field winding.

20. Apparatus according to claim 1 wherein said measuring means comprises means for measuring the linear acceleration of the propulsion vehicle said means being disposed fixed on said translator.

21. Apparatus according to claim 1 wherein said travelling field winding is a three phase travelling field winding and wherein a switch is provided in the connecting line between the fixed ac network and said travelling field winding, said switch in one position coupling said travelling field winding to said ac network and in the other position coupling the conductors on one side to a common neutral point.

* * * * *